Oct. 26, 1948.  C. DALEY  2,452,519
METHOD OF PREPARING METAL FOR METAL-TO-GLASS SEALS
Filed Sept. 28, 1944
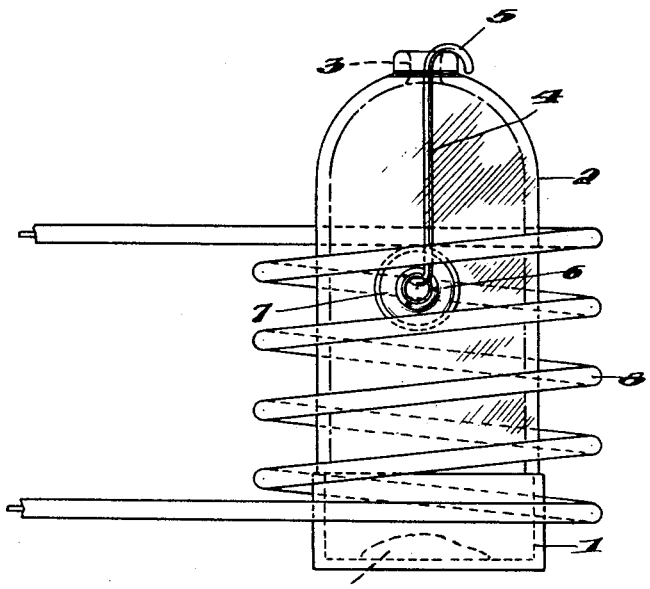
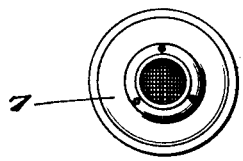
Inventor
Charles Daley
By J. Liston Smecker
his Attorney Patented Oct. 26, 1948

2,452,519

UNITED STATES PATENT OFFICE 2,452,519

METHOD OF PREPARING METAL FOR METAL-TO-GLASS SEALS

Charles Daley, West Newton, Mass., assignor to Radio Corporation of America, a corporation of Delaware Application September 28, 1944, Serial No. 556,219

5 Claims. (Cl. 117—106)

This invention relates to improvements in metal-to-glass seals, of the character used particularly in glass lamps, space discharge tubes and other such devices.

It is customary to use copper for the disc or wire that is to be sealed to glass. Copper and such metals that are to be sealed to glass require treatment before the sealing action can be obtained to effect a secure bond between the metal and the glass, which bond should be near the same point of expansion and contraction as the glass and metal.

It has been the common practice heretofore to subject the metal to a coating comprising a solution of borax. This has been used for many years but it has not been satisfactory, inasmuch as the coating is difficult to control and the borating coating will rub off in handling the articles. Furthermore, if the articles are not used immediately, they collect moisture from the atmosphere and change in characteristics, so as to render them unsatisfactory for use.

It has been proposed also to eliminate the difficulties encountered with borating treatments by oxidizing the metal by a flame of hydrogen, but this has led to difficulties of control and treatment which renders it unsatisfactory for use.

The object of this invention is to improve the characteristics of the articles to be bonded to glass, to obtain an effective seal with the glass which will withstand all of the tests required therefor.

This object is accomplished by coating the articles, such as a copper disc or wire, or copperclad wire, with a vapor of suitable material which will not rub off in the manner of ordinary borating treatments and which will act as a flux to produce an effective seal with the glass, bonding the glass and metal together so they will not separate and will hold an effective vacuum. The vapor preferably used comprises barium carbonate, borax and boric acid, which is heated with the article itself so that the vapor is absorbed in the surface of the article and forms an effective and secure coating thereon. The vaporizing of the material can be obtained by subjecting both the article and the material to the heating effect of a high frequency electric current, which will vaporize the powder and cause it to coat the surface of the article and to be absorbed thereby.

I have shown a preferred method of producing such a coating on copper aticles, in the accompanying drawings, in which:

Fig. 1 is a side elevation of a receptacle and bulb used for coating copper discs;

Fig. 2 is a plan view of the copper disc; and

Fig. 3 is a cross section through the disc sealed to glass.

In the application of the present invention as shown in Fig. 1, I have illustrated merely an example of apparatus that may be used for coating copper discs or washers according to this invention, but it will be understood that this may be modified in structure and amplified materially in treating a large number of such articles.

In this example, I have shown a metal receptacle 1 over which is disposed a glass bulb 2 that is inverted and mounted in any suitable manner over the receptacle 1. The bulb 2 has an open bottom end but with the top thereof substantially closed sufficiently to trap vapors in the bulb which may rise from the receptacle 1. The top of the bulb 2 has an opening 3 therethrough through which may be suspended a support 4 detachably mounted in the bulb. This support may be formed of wire provided with a hook 5 at its upper end to engage over the rim of the opening 3 and a separate hook 6 at its lower end to engage and support the article 7 thereon. This article is shown as a copper disc of the character sealed to glass in the production of vacuum or other space discharge tubes.

Surrounding the receptacle 1 and also the major portion of the bulb 2 is an electric coil 8, which extends over a sufficient portion of the receptacle to heat effectively the material contained therein, and also extending over such portion of the bulb 2 as to heat the article mounted therein. The coil 8 should be connected with a source of high frequency current sufficient to produce the desired heating effect in the receptacle and bulb, although radio frequency may be used therefor, if desired.

To obtain the desired coating on the article according to this invention, I prefer to use a prepared powdered material according to any one of the following:

(1) Equal parts of barium carbonate, borax and boric acid are placed in a pulverizer, such as a ball mill, and subjected to pulverizing action therein for approximately two hours, after which the powder resulting therefrom is removed and is ready for use.

(2) Equal parts of barium carbonate, borax and boric acid are placed in a hydrogen furnace or oven with sufficient heat to fuse these together but below the melting point, thus driving out all moisture. This material is then pulverized, as for instance, in a ball mill, after which it is sifted through a fine mesh screen, preferably of 240 mesh size, after which it is ready for use.

(3) The powdered material is prepared in the same manner as designated "(2)" above, except that I add 10% of sodium carbonate. This has the effect of forming a sodium oxide when heated with high frequency current as described above, in the coating of the article. This will give the articles a heavier finish and it will also cause the powder to vaporize more readily.

While the coating material may be prepared according to any one of the foregoing methods, the one selected for use will depend somewhat upon the results to be obtained, although I prefer to use number (2) for ordinary purposes.

The powder prepared according to one of the foregoing methods is placed in the bottom of the receptacle 1, as indicated at P, and the article 7 is suspended on the support 4 within the glass bulb 2 that is lowered over the receptacle 1. Then when the coil 8 is energized, it will heat the powder P and at the same time heat the article 7. The heat applied by high frequency or radio frequency current, in the example given, should be sufficient to effect vaporization of the powder which will cause the vapors to rise in the bulb and adhere to the article. The latter is ordinarily formed of copper and the heating will tend to cause the vapors to be absorbed in the surface thereof.

The amount of coating is governed by the amount of heat applied to the metal, and the speed with which the powder is vaporized, which results can be observed however through the glass bulb. A light coating is obtained by heating the copper article to a dull red, and using only sufficient heat for slow vaporization of the powder. A medium coating may be obtained by heating the copper article to a bright cherry red while vaporizing the powder more rapidly. A very heavy coating can be obtained by keeping the copper article a cherry red and vaporizing the powder fast enough to cause substantially a bubbling of it. These different effects are obtained with little practice by observing the results in use.

The heating of the copper piece in the presence of the vapor has a tendency to draw the vapor into the surface of the copper, whereby the copper coating will not rub off when the article is cooled. It leaves a desirable red finish on the copper article and acts as a flux when a seal is made between the copper article and glass, one form of which seal is illustrated as an example in Fig. 3.

I have found from actual tests with seals made according to the process described above that the sealing effect is complete and satisfactory both with hard and with soft glass and have subjected such seals to very severe tests without destroying the metal-to-glass seal produced. One such test used was to place the seal in boiling water for several minutes and then in ice cold water, using Dry Ice, but the seal was not broken but remained firm and effective when subjected to this extreme test, and remained vacuum tight.

The invention is not restricted to washers or discs of the character described, but may be applied to other articles, such as wire, copper-clad wire, and to articles of jewelry, where the results desired and described above may be obtained. The process would be carried out with such articles substantially in the same manner as described above and similar results obtained.

I claim:

1. A process of preparing a copper article for glass seal therewith comprising heating said article to at least a dull red heat and a powder containing equal parts of barium carbonate, boric acid and borax, and continuing the heating sufficiently to vaporize the powder, and forming a coating thereof on the article by applying the vapor to the article in heated condition.

2. The improvement in the art of preparing a copper surface for glass-to-metal seal comprising, heating a powdered composition containing equal parts of barium carbonate, alkali metal borate and boric acid to form a vaporous atmosphere, heating the copper surface to at least a dull red heat, and forming a coating by subjecting the surface in heated condition to the vaporous atmosphere.

3. The improvement as set forth in claim 2 in which the composition contains about ten percent alkali metal carbonate.

4. The improvement in the art of preparing a copper surface for glass-to-metal seal comprising, heating to fuse together equal parts of barium carbonate, borax and boric acid, pulverizing the product, and heating the pulverized product to form a vaporous atmosphere, heating the copper surface to at least a dull red heat, and forming a coating by subjecting the surface in heated condition to the vaporous atmosphere.

5. The improvement as set forth in claim 2 in which the copper surface, the vapor and the powdered composition are subjected to high frequency heating.

CHARLES DALEY.

REFERENCES CITED

The following references are of record in the file of this patent:

UNITED STATES PATENTS

| Number | Name | Date |
|---|---|---|
| 498,901 | Lodyguine | June 6, 1893 |
| 1,266,614 | Newcomb | May 21, 1918 |
| 1,268,647 | Van Keuren | June 4, 1918 |
| 1,774,410 | Van Arkel | Aug. 26, 1930 |
| 1,833,087 | Migeot | Nov. 24, 1931 |
| 2,047,029 | Muller | July 7, 1936 |
| 2,178,081 | Piore | Oct. 31, 1939 |
| 2,239,551 | Dalton et al. | Apr. 22, 1941 |
| 2,293,146 | Kautz | Aug. 18, 1942 |